(No Model.) 3 Sheets—Sheet 1.

B. H. COOK.
ASH SIFTER.

No. 464,183. Patented Dec. 1, 1891.

WITNESSES:
John Becker
Fred White

INVENTOR:
Burton H. Cook,
By his Attorneys,
Arthur E. Fraser & Co.

(No Model.) 3 Sheets—Sheet 2.

B. H. COOK.
ASH SIFTER.

No. 464,183. Patented Dec. 1, 1891.

WITNESSES:
John Becker
Fred White

INVENTOR:
Burton H. Cook,
By his Attorneys,
Arthur E. Fraser &Co.

(No Model.) 3 Sheets—Sheet 3.

B. H. COOK.
ASH SIFTER.

No. 464,183. Patented Dec. 1, 1891.

WITNESSES:
John Becker
Fred White

INVENTOR:
Burton H. Cook,
By his Attorneys,
Arthur B. Fraser & Co.

THE NORRIS PETERS CO., PHOTO-LITHO., WASHINGTON, D. C.

UNITED STATES PATENT OFFICE.

BURTON H. COOK, OF BROOKLYN, NEW YORK.

ASH-SIFTER.

SPECIFICATION forming part of Letters Patent No. 464,183, dated December 1, 1891.

Application filed June 27, 1891. Serial No. 397,677. (No model.)

*To all whom it may concern:*

Be it known that I, BURTON H. COOK, a citizen of the United States, residing in Brooklyn, in the county of Kings and State of New York, have invented certain new and useful Improvements in Ash-Sifters, of which the following is a specification.

This invention relates to ash-sifters designed to be placed over an ash-receptacle and into which cinders or coal may be placed to be screened, the screened coals being delivered from a chute, while the ashes and dust fall through the screen into the ash-receptacle.

My invention relates in part to improvements upon the rotary sifter patented by me January 21, 1890, No. 419,751.

The principal features of my invention relate to the construction of a sheet-metal casing for the rotary screen.

Figure 1:
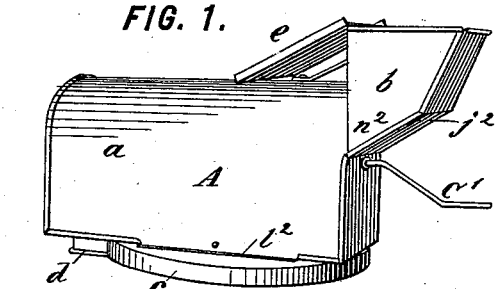
Figure 2:
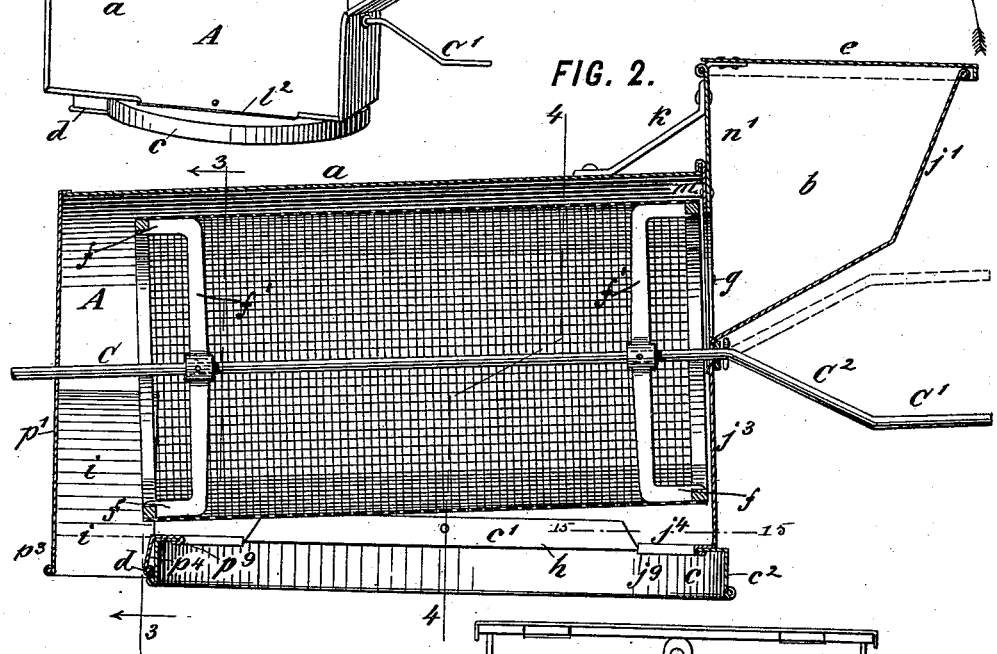
Figure 3:
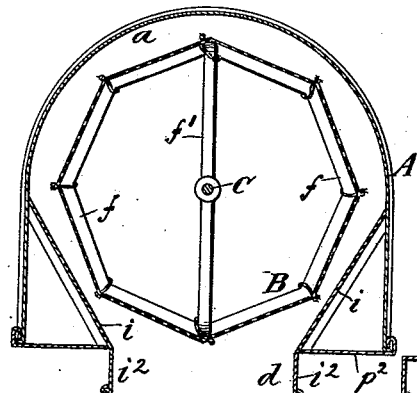
Figure 4:
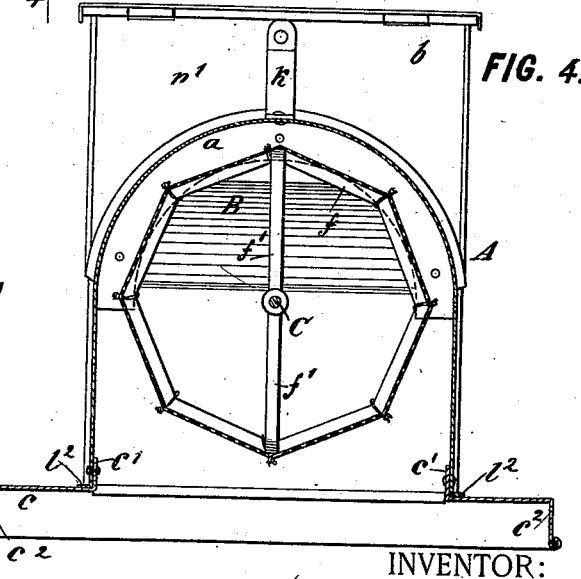
Figure 5:
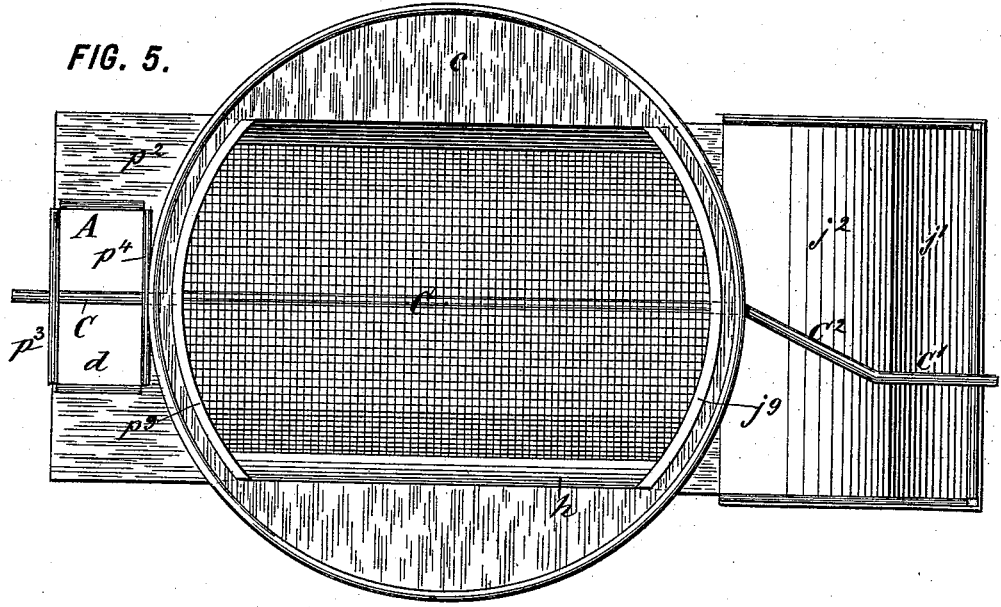
Figure 14:
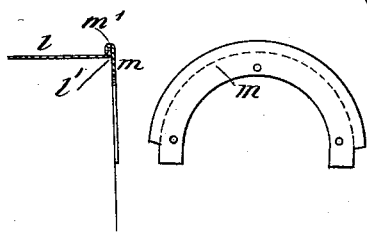
Figure 15:
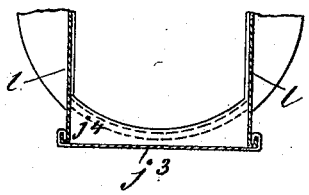

Figure 1 is a perspective view of my improved ash-sifter. Fig. 2 is a vertical longitudinal mid-section thereof. Fig. 3 is a transverse section thereof on the line 3 3 in Fig. 2. Fig. 4 is a transverse section thereof on the line 4 4 in Fig. 2. Fig. 5 is a bottom view thereof. Figs. 6 to 13, inclusive, are plan views of the several sheet-metal blanks of which the casing of the sifter is constructed. Fig. 14 is a fragmentary longitudinal section and end view of the parts $l$ and $m$ united. Fig. 15 is a fragmentary horizontal section of the front end of the casing on the line 15 15 in Fig. 2.

My improved sifter consists of a sheet-metal casing A and a rotary screen B, mounted on a shaft C, turning in bearings in the ends of the casing A, and provided on its front end with a crank C', by which to turn it. The casing is made with a semi-cylindrical or arched trunk or screen-chamber $a$, a hopper $b$ on its front end, a flanged bottom $c$, adapted to set over a barrel or other ash-receptacle, and a discharge-spout $d$ at the rear end. The hopper $b$ has a hinged lid $e$. The rotary screen B is an open-ended cylinder or polygon, preferably an octagon, as shown in Fig. 4, made of strong wire-gauze of suitable mesh, stretched over two rings $f f$ at opposite ends, which are supported by means of spokes $f'$ on the shaft C. The shaft is mounted at a slight inclination, so that the screen shall slope sufficiently to cause coals entered at its higher end to descend as it is revolved toward its lower end. The coals, cinders, or ashes to be screened are placed in the hopper $b$, from which, by reason of the inclined bottom thereof, they slide down through an opening $g$ above the shaft C into the open upper end of the screen B. The cover $e$ being closed, the crank C' is turned, thereby rolling the mass around within the screen and causing the ashes and dust to fall out through the screen and through the bottom opening $h$ into the ash-barrel or receptacle beneath, while the coals or cinders travel down the inclined sides of the screen and fall out through an outlet or spout $d$ into a coal scuttle or receptacle. At the discharge end two inclined chutes or deflecting-plates $i\ i$ are provided, arranged to direct to the outlet $d$ any coals or cinders that may fall on them. The hopper $b$ terminates entirely above the axis of the shaft C, and has its bottom plate $j^2$ inclined at such an angle as to make room below it for the inclined portion $C^2$ of the crank, so that the latter may rotate freely beneath the hopper, while its extreme outer end need project no farther forward from the trunk of the casing than the projection of the upper front side of the hopper, while yet leaving the crank portion C' of sufficient length to form a suitable handle. By this construction the sifter is made very compact and at the same time very sightly, there being no waste space or dead-chamber in front of the trunk. The rear side of the hopper where it projects above the top of the trunk is strengthened by a supporting-brace $k$.

I will now describe how the sheet-metal casing A is constructed. It is made up of several pieces or blanks of sheet metal, preferably strong sheet-iron, cut to the proper shape and afterward bent and fitted together, being fastened by suitable flanges and rivets, after which the casing is dipped in a galvanizing-bath, which serves to solder all the joints as well as to give a galvanized coating to the metal.

Figure 6:
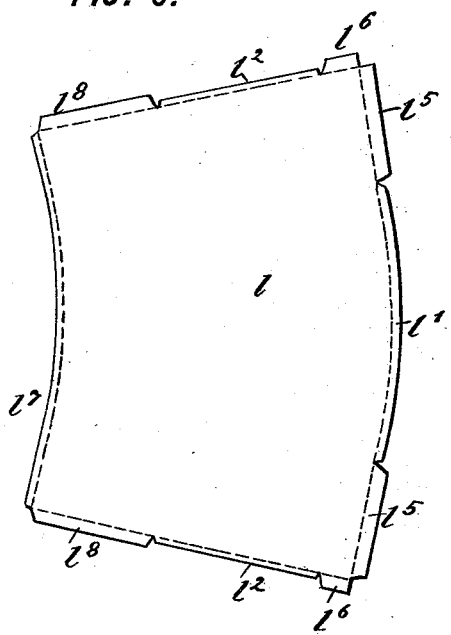
Figure 7:
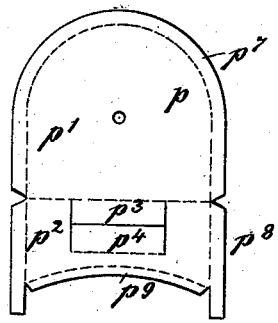
Figure 8:
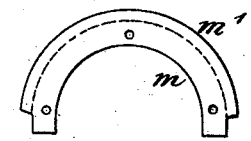

Fig. 6 shows the blank $l$ from which the arched trunk $a$ is formed. The metal cut to this shape is bent to the form shown in cross-section in Figs. 3 and 4, its projecting end portion $l'$ being turned outwardly to form a flaring flange extending around the crown and the portions $l^2$ being turned outwardly horizontally. The blank $m$ (shown in Fig. 8) has its flange $m'$ turned inwardly, embracing the flange $l'$, in the manner shown best in Fig. 14, so that the piece $m$ forms thus an inturned flange at the front end of the blank $l$ and extending for about a half-revolution.

The hopper $b$ and the front end of the trunk $a$ are made of two pieces or blanks $j$ (shown in Fig. 11) and $n$. (Shown in Fig. 12.) The blank $j$ is bent to form the front $j'$ and sloping bottom $j^2$ of the hopper, while the portion beneath (lettered $j^3$) forms the front of the body portion $a$ and the lower section $j^4$ extends beneath the lower front end of the body or trunk. The portions $j^3$ and $j^4$ have flanges $j^5$ and $j^6$, which are united by seaming in the usual manner to corresponding flanges $l^5 l^6$, formed on the blank $l$, the seams formed by the union of the flanges $j^5 l^5$ being clearly shown in horizontal cross-section in Fig. 15. The blank $n$ forms the rear and both sides of the hopper $b$, being divided by three vertical bends into a rear section $n'$ and two wings or side sections $n^2$. The section $n'$ forms the back of the hopper, as shown at $n'$ in Figs. 2 and 4, while the wings $n^2$ form the sides of the hopper. These wings are formed with flanges $n^7 n^7$, which are seamed to corresponding flanges $j^7$, formed on the sections $j' j^2$ of the blank $j$. The top flanges $j^8$ and $n^8$ are bent around a wire to form a finish for the mouth of the hopper. The hopper is firmly secured to the front end of the trunk $a$ by riveting its back wall $n'$ to the flange $m$, applied to the front end of the arched portion of the trunk in the manner already described. To further stiffen this connection the brace $k$ is applied and riveted to the top of the trunk and the upper part of the rear wall of the hopper.

The rear end of the trunk $a$ is formed of a blank $p$, (shown in Fig. 7,) and which is bent transversely at right angles, forming it into two sections $p'$ and $p^2$, of which the former closes the rear end of the trunk and the latter closes the under side of its overhanging portion. This blank $p$ is formed with flanges $p^7$ and $p^8$, which are seamed to flanges $l^7$ and $l^8$ on the rear end and rear under side of the blank $l$. The section $p^2$ is cut in the manner indicated in Fig. 7 to form the flaps $p^3$ and $p^4$, which are turned downwardly at right angles to section $p^2$, so that the flap $p^3$ forms an uninterrupted downward continuation of the rear end wall $p'$, as shown in Fig. 2. These flaps thus constitute the two opposite sides of the delivery-spout $d$.

Figure 10:
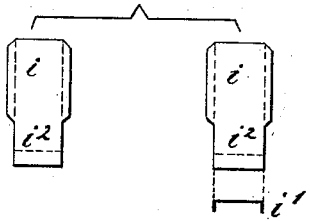
Figure 11:
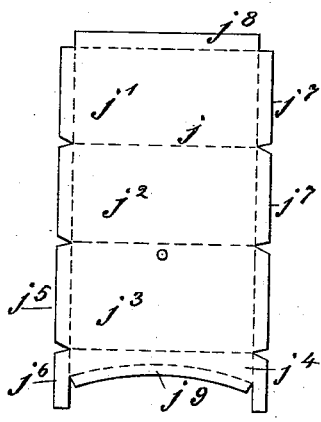
Figure 12:
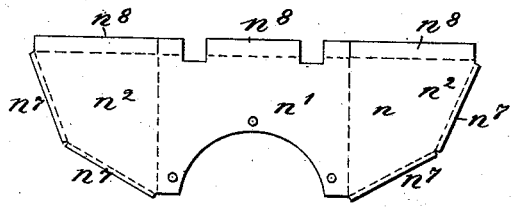

Two inclined slides $i$ $i$ are cut from blanks of the shape shown in Fig. 10, having lateral flanges, which are bent at right angles to stiffen them, as shown in the cross-section marked $i'$ in Fig. 10. They also have end projections $i^2$, which extend down through the bottom opening in the section $p^2$, in the manner shown in Fig. 3, to constitute the opposite ends of the spout $d$. These downward projections might be formed with flanges and seamed to the projections $p^3 p^4$, or the parts will be sufficiently connected by wiring the bottom edges, as shown.

Figure 9:
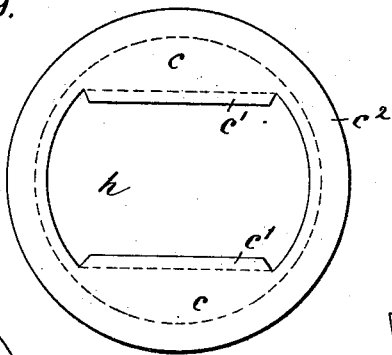

The bottom $c$ is constructed of the blank shown in Fig. 9, which is cut out of circular form, with a hole or opening $h$ formed in its center, having flanges $c$ projecting into it. The outer portion $c^2$ is preferably integral with the blank $c$ and is turned down and preferably has its edge wired. The flanges $c' c'$ are turned up perpendicularly, and when the bottom is applied to the trunk $a$ these flanges project up within the trunk, as shown best in Fig. 4, and are riveted thereto. The flanges $l^2$ are turned outwardly from the trunk and rest on the top of the bottom $c$, as shown in Fig. 4, whereby a firm seat is formed. The bottom portions $j^4$ and $p^2$ also rest on the bottom $c$, and are further attached thereto by flanges $j^9$ and $p^9$, which project beyond the opening in $c$ and are bent down to engage the end portions of the opening—that is, the portions beyond the flanges $c'$, as best shown in Figs. 2 and 5. The connections formed by these several flanges are greatly strengthened by the soldering action of the galvanizing-bath.

Figure 13:
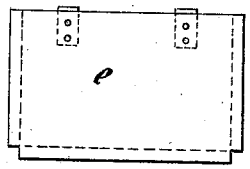

The hopper-lid $e$ is made of the blank shown in Fig. 13, having side and end flanges which are turned down to partly inclose the mouth of the hopper. This lid is hinged in any suitable manner to the hopper, so that it may be thrown back to the position shown in Fig. 1.

The casing A, constructed as thus described, is very light and strong and is made of few pieces, which are connected in a simple manner, involving the minimum of labor, so that the entire construction is strong, compact, and cheap.

I claim as my invention the following defined novel features, substantially as hereinbefore specified, namely:

1. In an ash-sifter, a casing comprising a trunk or screen-chamber $a$, formed of an arched sheet-metal blank $l$ and sheet-metal ends, and a hopper $b$, formed of a sheet-metal blank $n$, constituting the back and side sections thereof, and with a sheet-metal blank $j$, forming the front and bottom of said hopper and the front end of said trunk, substantially as specified.

2. In an ash-sifter, a casing comprising a trunk or screen-chamber $a$, formed of an arched sheet-metal blank $l$, flanged at $l'$, and an inward flange-piece $m$, seamed thereto at one end, and a hopper $b$, the rear wall $n'$ whereof is fastened to said flange-piece $m$, substantially as specified.

3. In an ash-sifter, a casing comprising a trunk or screen-chamber $a$, formed of an arched sheet-metal blank $l$, and a hopper $b$, formed with back and side sections and with a blank $j$, constituting the front and bottom sections of said hopper and the lower front end wall of said trunk, and having a portion $j^4$ bent partly beneath the trunk to form the end bottom therefor.

4. In an ash-sifter, a casing comprising a trunk or screen-chamber $a$, having a hopper $b$ at one end and closed at its other end by a sheet-metal blank $p$, which is bent horizontally beneath the end at $p^2$ to form an end bottom therefor and formed with an outlet-opening through said bottom.

5. In an ash-sifter, a casing comprising a trunk or screen-chamber $a$, having a hopper $b$ at one end and closed at its other end by a sheet-metal blank $p$, which is bent horizontally beneath the end at $p^2$ to form an end bottom therefor, and said bottom portion cut to form flaps $p^3 p^4$, bent downward and united with end sections to form a delivery-spout $d$, projecting downward from said bottom.

6. In an ash-sifter, a casing comprising a trunk or screen-chamber $a$, having a hopper $b$ at one end and closed at its other end by a metal plate $p$, which is bent beneath it at $p^2$ to form the bottom end portion, an outlet-opening formed in this bottom portion, and deflecting corner-plates $i\ i$ set in said end portion and terminating at the lower ends in communication with said opening.

7. In an ash-sifter, a casing comprising a trunk or screen-chamber $a$, having a hopper $b$ at one end and closed at the other by a metal plate $p$, which is bent beneath it at $p^2$ to form the bottom end portion, an outlet-opening formed in said bottom portion, and deflecting corner-plates $i\ i$ in said end portion, with their lower ends extending through and prolonged downwardly beyond said opening to form the ends of a delivery-spout $d$, substantially as specified.

8. In an ash-sifter, a casing comprising a trunk or screen-chamber $a$, consisting of an arched plate and end plates applied to its opposite ends and turned under its ends, and a bottom $c$, applied beneath said trunk, having an opening $h$ communicating with the interior thereof, and the end edges of said end plates flanged over the end portions of said opening, whereby the bottom is held firmly to the trunk, substantially as specified.

9. In an ash-sifter, a casing comprising a trunk or screen-chamber $a$, consisting of an arched plate and end plates applied to its opposite ends, and a bottom $c$, applied beneath said trunk, having an opening $h$, and flanges $c'$, turned up from said opening within the sides of the trunk and riveted thereto.

10. In an ash-sifter, a casing comprising a trunk or screen-chamber $a$, consisting of an arched plate and end plates applied to its opposite ends and turned under its ends and seamed to its end and bottom edges, the sides of said trunk having outturned flanges $l^2$ extending between the seamed end portions of its bottom, and a bottom $c$, applied beneath said trunk, having an opening $h$ communicating with the interior thereof, and flanges $c'$, turned up within the trunk and riveted, with the flanges $l^2$ resting on said bottom, substantially as specified.

In witness whereof I have hereunto signed my name in the presence of two subscribing witnesses.

BURTON H. COOK.

Witnesses:
GEORGE H. FRASER,
FRED WHITE.